United States Patent [19]

Buckmaster et al.

[11] Patent Number: 4,742,122

[45] Date of Patent: May 3, 1988

[54] MELT-PROCESSIBLE TETRAFLUOROETHYLENE/PERFLUOROOLEFIN COPOLYMERS AND PROCESSES FOR PREPARING THEM

[75] Inventors: Marlin D. Buckmaster; Richard A. Morgan, both of Vienna, W. Va.

[73] Assignee: E. I. Du Pont de Nemours and Company, Wilmington, Del.

[21] Appl. No.: 16,517

[22] Filed: Feb. 17, 1987

Related U.S. Application Data

[63] Continuation of Ser. No. 791,432, Oct. 25, 1985, abandoned.

[51] Int. Cl.$^4$ ............................................... C08F 6/26
[52] U.S. Cl. .............................. 525/326.2; 525/326.4; 525/374; 528/481
[58] Field of Search ........................ 525/326.2, 326.4; 528/481

[56] References Cited

U.S. PATENT DOCUMENTS

| | | | |
|---|---|---|---|
| 3,046,263 | 7/1962 | Whitlock | 260/92.1 |
| 3,085,083 | 4/1963 | Schreyer | 525/326.2 |
| 3,911,072 | 10/1975 | Saito et al. | 264/117 |
| 4,626,587 | 12/1986 | Morgan et al. | 528/481 |

FOREIGN PATENT DOCUMENTS

| | | |
|---|---|---|
| 0073121 | 8/1982 | European Pat. Off. |
| 0117450 | 1/1984 | European Pat. Off. |
| 1210794 | 1/1969 | United Kingdom |
| 1448429 | 9/1976 | United Kingdom |
| 1591541 | 8/1977 | United Kingdom |

OTHER PUBLICATIONS

Chemical Abstracts, vol. 104, No. 22, Jun. 2, 1986, p. 43, Abs. No. 187456g.

*Primary Examiner*—Joseph L. Schofer
*Assistant Examiner*—Bernard Lipman

[57] ABSTRACT

Melt-processible tetrafluoroethylene/perfluoroolefin copolymer granules, and process for their preparation, are disclosed having improved thermal stability, high purity and reduced bubble tendency.

6 Claims, No Drawings

MELT-PROCESSIBLE TETRAFLUOROETHYLENE/PERFLUOROOLE-FIN COPOLYMERS AND PROCESSES FOR PREPARING THEM

This application is a continuation of application Ser. No. 791,432, filed Oct. 25, 1985, now abandoned.

FIELD OF THE INVENTION

This invention relates to melt-processible tetrafluoroethylene/perfluoroolefin copolymer granules having good particle flow characteristics and thermal stability.

Such melt-processible copolymers can be extruded onto wire or extruded into film or tubing, or used as a coating, or can be used in rotomolding applications to make hollow articles or linings.

BACKGROUND OF THE INVENTION

Tetrafluoroethylene polymers are of two types. One is non-melt-processible polymers where the melt viscosity is too high to process the polymers by ordinary melt-extrusion processes. Instead, the polymers are ordinarily sintered or paste extruded depending on the type polymer made. The other class is melt-processible tetrafluoroethylene copolymers having melt viscosities in the melt extrudable range.

Melt-processible tetrafluoroethylene (TFE) copolymer resins directly from the polymerizer and/or coagulator are referred to as fluff or powder. The fluff is normally humid heat treated and/or melt extruded to stabilize it, such as described in U.S. Pat. No. 3,085,083. There are applications such as rotocasting in which a free-flowing powder (herein called "granules") is preferable to melt-extruded pellets or where a high degree of purity of the resin is desired. Although rotolining and rotocoating processes differ in several technical respects from rotomolding, for the sake of convenience the term "rotocasting" is used herein to refer to all three generically unless otherwise indicated.

To facilitate handling of such granules, it is desirable to improve particle characteristics. Melt-processible copolymers that are coagulated from an aqueous dispersion and dried are friable, and form fines easily which give poor handling properties. It would be desirable to provide a melt-processible copolymer that is both stable and easily handled in a minimum of processing steps. It is particularly desirable to provide a copolymer that could be used both in conventional melt-fabrication processes and in rotocasting applications where particle characteristics are important.

It is also desirable to obtain resins that are thermally stable. A number of stabilization approaches are known in the art, most of which require melting the resins. Thus resins stabilized by these methods are generally available only as pellets—not (without tedious and expensive regrinding steps) as the free-flowing granules that are the basis of this invention.

Another desirable feature of such resins is that the granules should be low in metal contamination. If the granules have been melted in traditional thermoplastic processing equipment, contamination occurs inevitably when the corrosive tetrafluoroethylene copolymer melts come in contact with the interior metal surfaces of thermoplastic processing equipment, even when corrosion-resistant alloys are used. Copolymers having low levels of metal contamination are particularily desirable for applications in the semiconductor industry.

SUMMARY OF THE INVENTION

The subject of this patent is a new product form, namely, free-flowing, attrition-resistant, generally spherical, heat-stable granules. These granules are of high purity and thermal stability in air, having particular utility in fabricating free-standing rotomolded articles and providing defect-free polymeric coatings or linings, especially those produced by rotolining metal process equipment. The novel compositions have improved thermal stability and low bubble tendency. More specifically, the composition is a melt-processible, substantially nonelastomeric tetrafluoroethylene copolymer comprising recurring units of 80–98 mole % of tetrafluoroethylene and complementally 2 to 20 mole % of at least one perfluoroolefin of 3 to 8 carbon atoms, which copolymer has (a) a melt viscosity between $0.1 \times 10^4$ and $100 \times 10^4$ poise at 372° C.,
(b) a substantially spherical particle shape and a sphere factor between about 1 and 1.5,
(c) an attrition factor of less than 60, preferably between 5 and 60,
(d) fewer than a total of 80 unstable end groups per $10^6$ carbon atoms,
(e) an average particle size between 200 and 3000 micrometers.

The process of this invention employs melt-processible tetrafluoroethylene/perfluoroolefin copolymers that have been polymerized in a substantially aqueous medium. When prepared in an aqueous medium, the copolymers are isolated by solvent-aided coagulation preceded by gelation. The resulting coagulated granules are spherical in shape, which facilitates handling. The granules are then dried and hardened by subjecting them to elevated temperatures between the differential scanning calorimeter (DSC) peak melting point and 25° C. below the melt onset temperature (i.e., the granules are heat treated to harden them, but not so as to completely melt or substantially deform them). The hardening facilitates screen sieving or mechanical screen sifting into desired particle sizes and facilitates handling by reason of reduced friability.

The granules may be subjected, if desired, to an atmosphere containing fluorine to convert unstable end groups, if present in unsuitable amounts, to stable fluorinated end groups, thereby reducing bubbling or evolution of volatiles during further end-use heat processing. The granules may be fluorinated to remove color also.

These granules are especially well suited for rotocasting applications because of the optimal particle size and free-flowing characteristics combined with low bubble tendency. A further benefit of the stabilized free-flowing granules is that such granules have not been melted in conventional thermoplastic processing equipment and are low in metal contamination.

DESCRIPTION OF THE INVENTION

Specific perfluoroolefin comonomers include hexafluoropropylene, perfluorobutylene, perfluorooctene, and the like.

Comonomer content can range from 3 mole percent up to about 20 mole percent, and more than one comonomer can be present.

Small amounts of third comonomers may be present e.g. up to 5 mole percent. Such third comonomers can be represented by the formulas:

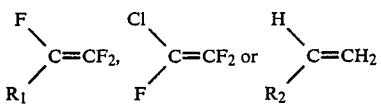

wherein $R_1$ is $-OR_f$ or $-OR_fX$ in which $R_f$ is a perfluoroalkyl radical of 1-12 carbon atoms, $-R_f-$ is a perfluoroalkylene diradical of 1-12 carbon atoms in which the attaching valences are at each end of the chain, and X is H or Cl; and $R_2$ is $-R_f$ or $-R_f-X$. Specific third comonomers include perfluoro(n-propyl vinyl ether), perfluoro(n-heptyl vinyl ether), 3,3,3-trifluoropropylene-1,3,3,4,4,5,5,6,6-nonafluorohexene-1,3-hydroperfluoro(propyl vinyl ether), or mixtures thereof.

The comonomer content is low enough that the copolymers are plastics rather than elastomers, i.e., they are partially crystalline and after extrusion do not exhibit a rapid retraction to original length from a stretched condition of 2× at room temperature.

The aqueous polymerization of TFE with various comonomers is well known. The reaction medium consists of water, monomers, a dispersing agent, a free-radical polymerization initiator, optionally, a chain-transfer agent and, optionally, a water-immiscible fluorocarbon phase, as described, for example, in U.S. Pat. No. 3,635,926.

Polymerization temperatures between 20°-140° C. may be employed and pressures of 1.4-7.0 MPa are ordinarily used. Generally higher temperatures and pressures are employed to increase polymerization rates. The TFE and sometimes the comonomer are fed continuously to the reaction vessel to maintain reaction pressure, or in some instances the comonomer is all added initially and pressure is maintained with TFE feed only. The monomer(s) are fed until the desired final dispersion solids level (15-50%) is achieved. The agitator speed in the reaction vessel may be held constant during polymerization or it may be varied to control polymerization rate.

Initiators commonly employed are free-radical initiators such as ammonium or potassium persulfate or disuccinic acid peroxide. The dispersing agent will be present in an amount between 0.01-0.5 percent based on weight of aqueous medium and preferably between 0.05-0.1 percent.

By the term "melt-processible" is meant that the copolymer can be processed (i.e., fabricated into shaped articles such as films, fibers, tubes, wire coatings and the like) by conventional melt-processing equipment. Such requires that the melt-viscosity of the copolymer at the processing temperature be no more than $10^7$ poise. Preferably it is in the range of $10^4$ to $10^6$ poise at 372° C.

Melt viscosities of the melt-processible polymers are measured according to American Society for Testing and Materials Method D-1238, modified as follows: The cylinder, orifice and piston tip are made of a corrosion-resistant alloy, such as Haynes Stellite(tm) 19 or Inconel(tm) 625. The 5.0 g sample is charged to the 9.53 mm inside diameter cylinder which is maintained at 372° C.±1° C. Five minutes after the sample is charged to the cylinder, it is extruded through a 2.10 mm diameter, 8.00 mm long square-edge orifice under a load (piston plus weight) of 5000 grams. This corresponds to a shear stress of 44.8 kPa. The melt viscosity in poises is calculated as 53170 divided by the observed extrusion rate in grams per minute.

The copolymers prepared by the foregoing aqueous polymerization process are colloidally dispersed in the polymerization medium. The polymer is recovered from the dispersion by coagulation. Normal coagulation of aqueous polymer dispersions by mechanical shear tends to give a very finely divided powder which has poor handling characteristics. Several techniques might be used to obtain the preferred larger particle sizes. The combination of mechanical agitation and certain chemical additions can be used to obtain larger, spherical particles. In the process of the invention, the aqueous dispersion is gelled with a gelling agent, a mineral acid, while being agitated. Preferably nitric acid is used as the gelling agent. A water-immiscible liquid is then added to the gel while continuing the agitation. The gel breaks up into separate phases of water and liquid-wetted polymer particles. The particles are then dried. The granule size is a function of the dispersion particle size, the ratio of water-immiscible liquid to polymer, and the agitation conditions. The granule size is, as desired, much larger than that achieved if the dispersion is coagulated by mechanical shear action alone. Usually, the amount of water-immiscible liquid will be 0.25 to 3.0 part per part of polymer on a dry weight basis. About 0.1 to 10 parts of $HNO_3$ per 100 parts of polymer weight can be used. Nitric acid is preferred because it is not corrosive to stainless-steel equipment and readily volatilizes in a subsequent baking step. Coagulated particles obtained by this process generally have a size between 200-3000 micrometers. The product is separated, washed and dried at 80 to 150° C. for from 4 to 30 hours.

Preferably, the water-immiscible liquid should have a surface tension of not more than 35 dyne/cm at 25° C. and it should have a normal boiling point in the range of 30 to 150° C. Typical examples of the immiscible liquid usable in the invention are aliphatic hydrocarbons such as hexane, heptane, gasoline and kerosene, or mixtures thereof, aromatic hydrocarbons such as benzene, toluene and xylene, halogenated derivatives such as carbon tetrachloride, monochlorobenzene, the trichlorotrifluoroethanes, difluorotetrachloroethanes, and liquid oligomers of chlorotrifluoroethylene.

During this coagulation step, low molecular weight oligomers dissolve in the aqueous phase of the coagulant system, which results in a copolymer having reduced content of low molecular weight materials that could cause volatiles problems during processing.

The dried particles are generally spherical and have a sphere factor less than 1.5, and preferably less than 1.2. The sphere factor is a measure of the degree of roundness of the particles. A sphere factor of 1 represents a geometrically spherical particle.

The particles are then hardened by heat treatment until the attrition factor, as described herein, is less than 60 and preferably less than 25, but before the granules agglomerate. By the term "before the granules agglomerate" is meant that the D50 as hereinafter defined does not increase by more than 20%.

Heat-hardening of the granules formed in the coagulation step occurs relatively close to the copolymer melting point. The temperature at which hardening occurs depends not only on the copolymer melting point but also on other characteristics such as comonomer and molecular weight distributions. These characteristics influence the temperature at which the onset of melting occurs.

This heat-hardening phenomenon occurs when the copolymer granules are held at a temperature within the range between the copolymer melting point and a temperature 25° C. below the melt onset temperature, as measured by differential scanning calorimetric (DSC) methods described herein. The granules must be exposed to temperatures within this range for a time sufficient to impart a useful degree of hardness. The resulting heat-hardened granules are not completely melted and are only partially sintered. If the melting heat ratio as hereinafter defined is below 1.2, the polymer granules have been melted and begin to fuse together. After heat hardening, the granules have a level of hardness useful in preventing attrition and fines generation during subsequent steps in the manufacturing process and also in melt fabrication.

The manufacturing process for the granules may optionally include sizing, such as screen granulation to mechanically force all the granules through a screen of selected mesh size which breaks up the oversize particles while maintaining the useful particle characteristics described herein. Some lump formation occurs during heat hardening and fluorination. Such screen granulation is efficient in removing these lumps, which are detrimental in rotocasting operations.

These granules may contain unstable end groups. Whether unstable end groups may be found in the untreated polymer directly from polymerization depend on the initiator used and on the presence of pH and molecular weight modifiers. For example, if ammonium or potassium persulfate is employed as the initiator, the polymer end groups are essentially all carboxylic acid (—CO$_2$H) The acid end groups are found in both monomeric or dimeric forms. If a pH modifier such as ammonium hydroxide is present, then a large portion of the carboxylic acid ends may be converted to amide ends (—CONH$_2$). If a molecular weight modifier such as methanol is employed, then a portion of the ends may be carbinol (—CH$_2$OH) as well as the more stable difluoromethyl ends (—CF$_2$H). The presence of methanol can also lead to methyl ester ends (—CO$_2$CH$_3$). Vinyl ends (—CF=CF$_2$) are generally not a direct result of polymerization but are formed as a result of decarboxylation of the initially formed carboxylic acid ends. Acid fluoride ends (—COF) generally result from air oxidation of the vinyl ends or the carbinol ends. All of the end groups described above (except —CF$_2$H) are considered to be thermally and/or hydrolytically unstable. This is what is meant by the term "unstable end groups". They have a tendency to cause bubbles or voids upon melt fabrication. These voids can be detrimental to the physical or electrical properties of fabricated articles. It is desirable to have less than 80 of these unstable ends per 10$^6$ carbon atoms in the polymer.

The number of unstable end groups described above may be reduced, if their presence will be detrimental to the end use application, by treatment of the polymer with fluorine. The fluorination may be carried out with a variety of fluorine radical generating compounds but preferably the polymer is contacted with fluorine gas. Since reactions with fluorine are very exothermic, it is preferred to dilute the fluorine with an inert gas such as nitrogen. The level of fluorine in the fluorine/inert gas mixture may be 1 to 50 volume % but is preferably 10–30%. Any reaction temperature between 0° C. and the polymer melting point may be used but a temperature range between 130° and 200° C. appears to be practical to permit reasonable reaction times (1 to 5 hours under fluorine). It is preferred to agitate the polymer to expose new surfaces continuously. The gas pressure during fluorination may range from atmospheric to 1 MPa. If an atmospheric pressure reactor is used, it is convenient to pass the fluorine/inert gas mixture through the reactor continuously. After exposure of the polymer for the desired length of time, the excess fluorine is purged from the sample, which is then cooled.

Most of the unstable end groups are converted to perfluoromethyl (—CF$_3$) ends by the fluorine.

The preferred copolymers should have a melting heat ratio greater than 1.2. By melting heat ratio is meant the ratio of the heat of melting on its first melting to the heat of melting recorded on a second melting. This is an indication that the particles have not been melted completely.

TEST PROCEDURES

Attrition Factor

Particle hardness is measured by a screening test as follows:

Equipment

Fritsch Pulverisette(tm), Model 24-0217-000 (TeKmar Company, Cincinnati, OH)
Sieve (USA Standard Testing Sieves)
  51 mm high×203 mm dia×30 mesh for granules of D50 greater than 700 micrometers.
  51 mm high×203 mm dia×80 mesh for granules of D50 less than 700 micrometers.
Pan and dome lid, 203 mm dia.
19 mm diameter stainless-steel balls (32 g each)

Procedure

Place 100.0 g of polymer (W$_s$) onto the screen which has been placed on the preweighed pan (W$_o$). Place the dome lid on top and position in the Fritsch Pulverisette(tm) apparatus. Preset amplitude to 1.5 mm (amplitude setting of 3).

Attach the retaining straps to the lid and tighten securely. Set the timer for 10 min and activate. At the end of 10 min remove the lid and screen, brushing polymer adhering to the inside of the bottom rim into the pan. Weigh the pan (W$_1$). Place 12 of the stainless-steel balls on the screen and reassemble pan/screen/lid and place in the Pulverisette(tm). Set timer for 10 min and activate and adjust the amplitude to 1.5 mm. After 10 min disassemble the screen again brushing polymer adhering to the inside of bottom rim into the pan. Weigh the pan and contents again (W$_2$). Calculate attrition factor as follows:

$$\text{Attrition Factor} = \left[ \frac{W_2 - W_1}{W_s - (W_1 - W_0)} \right] 100$$

DETERMINATION OF SPHERE FACTOR

A small amount of sample is placed on a glass microscope slide, dispersed into a single layer by shaking slightly, and then photomicrographed. On a print, the largest and shortest diameters (a and b) of each particle are accurately measured to within ±5% using more than 30 particles selected at random.

The sphere factor is calculated according to the method of U.S. Pat. No. 3,911,072 as follows:

($n$ = number of particles measured)

-continued $$\text{Sphere Factor} = \frac{1}{n} \sum_{i=1,n} \frac{a_i}{b_i}$$

$(i = 1,2,3,\ldots,n)$

END GROUP ANALYSIS

The end groups in a fluorocarbon polymer are determined from the infrared spectrum of compression molded films. This technique has been described in previous patents such as U.S. Pat. No. 3,085,083.

The quantitative measurement of the number of end groups is obtained using the absorptivities measured on model compounds containing the end groups of interest. The end groups of concern, the wavelengths involved, and the calibration factors determined from model compounds are shown below:

| Endgroup | Wavelength, micrometers | Calibration Factor (CF) |
|---|---|---|
| —COF | 5.31 | 406 |
| —CO$_2$H(M) | 5.52 | 335 |
| —CO$_2$H(D) | 5.64 | 320 |
| —CO$_2$CH$_3$ | 5.57 | 368 |
| —CONH$_2$ | 2.91 | 914 |
| —CF=CF$_2$ | 5.57 | 635 |
| —CH$_2$OH | 2.75 | 2220 |

M = Monomeric, D = Dimeric

The calibration factor is a mathematical conversion to give end group values in terms of ends per 10$^6$ carbon atoms. The concentration of each type of end in a polymer film may generally be obtained from this equation:

$$\frac{\text{End Groups per}}{10^6 \text{ carbon atoms}} = \frac{\text{absorbance} \times CF}{\text{film thickness}}$$

where film thickness is in millimeters.

Some of the absorbance peaks may interfere with one another when —CO$_2$H(D), —CO$_2$H(M), and —CF=CF$_2$ ends are all present. Corrections have been developed for the absorbances of —CO$_2$H(D) (hydrogen-bonded carboxylic acid dimer) and the —CF=CF$_2$ ends. These are as follows (where u is wavelength in micrometers):

$$\frac{\text{absorbance } 5.46u - (0.3 \times \text{absorbance } 5.58u)}{0.91} = \begin{array}{c}\text{corrected}\\ \text{absorbance}\\ \text{for —CO}_2\text{H}(D)\end{array}$$

$$\frac{\text{absorbance } 5.57u - (0.3 \times \text{absorbance } 5.58u)}{0.91} = \begin{array}{c}\text{corrected}\\ \text{absorbance}\\ \text{for —CF=CF}_2\end{array}$$

The presence of —CONH$_2$ or —CO$_2$CH$_3$ may also interfere with the acid and —CF=CF$_2$ absorbances. Since these groups are generally the result of additives to polymerization their presence is generally predictable. A suspicion of —CONH$_2$ absorbance in the vicinity of 5.6 micrometers can be checked by searching for the auxiliary —CONH$_2$ band at 2.91 micrometers.

The polymer films (0.25 to 0.30 mm thick) are scanned on a Perkin-Elmer 283B spectrophotometer with a film of the same thickness, and known to contain none of the ends under analysis, in the instrument reference beam. The instrument is set up with a Response Time setting of 1, a Scan Time setting of 12 minutes, Ordinate Expansion of 2, a Slit Program of 7, and an Auto-Chek Gain control of 20%. The films are then scanned through the pertinent regions of the spectrum making sure that adequate base lines are established on each side of the pertinent absorbances.

The polymer films are generally compression molded at 270°–350° C. The presence of certain salts, particularly alkali metal salts, may cause end group degradation within this temperature range. If these salts are present, the films should be molded at the lowest possible temperature.

HEXAFLUOROPROPYLENE (HFP) CONTENT DETERMINATION

The HFP content in the melt-processible TFE/HFP copolymers described herein is determined by measurement of the ratio of the infrared absorbance at 10.18 micrometers to the absorbance at 4.25 micrometers. This ratio is referred to as the HFP index or HFPI. Reference films of known HFP content, as determined by F19 NMR, are also run to calibrate the HFPI. The mole percent HFP present is equal to 2.1 times the HFPI. Compression-molded films approximately 0.10–0.11 mm thick are scanned under a nitrogen atmosphere.

AVERAGE PARTICLE SIZE

U.S. Pat. No. 3,929,721 describes a dry-sieve analysis procedure. The "average particle size" is determined by a dry-sieving procedure in accordance with ASTM Procedure D-1457-81a (12.3.3) modified as follows. The 203 mm diameter sieve set is assembled in order, with the largest mesh opening on top. From the listing of U.S.A. Standard Testing Sieve sizes (ASTM E-11 Specification), four to eight adjacent sieves are selected with openings between the limits of 6 mesh and 200 mesh and which bracket the range into which the average particle size is expected to fall.

A 40 to 60 g representative portion of the sample to be tested, preferably obtained using a sample splitter and weighed to the nearest 0.01 g, is charged to the top screen. The screen set is shaken in a sieve shaker (typically a "Ro-Tap(tm)" shaker obtained from Fisher Scientific Co., Cat. No. 4-909) for about 10 minutes. After shaking, the net weight of material retained on each sieve is determined to the nearest 0.01 g.

The weight average particle size is determined based on plotting the cumulative percentage retained vs. sieve opening on log-probability paper as described in ASTM method D-1921-63, or by equivalent computer interpolation of these data. The average particle size in micrometers is read from the plot at the 50th percentile (D50) abscissa of cumulative weight percentage retained.

DSC ANALYSIS

DSC analyses are carried out with a Du Pont Model 1090 Thermal Analyzer using a Model 910 DSC cell base and the Du Pont General Analysis Program, Version 1.0. The instrument is calibrated as recommended by the manufacturer, using a 10mg indium standard. Polymer sample size is 6 to 10 mg, crimped into an aluminum capsule. Different heating and cooling cycles are used depending upon the melting point of the sample. Samples are scanned twice across the melting endotherm at 10° C. per minute from a temperature which is 90°±5° C. below to a temperature 40°±5° C. above the melting endotherm peak temperature. Between the first and second scanning of the endotherm, the sample is cooled from the maximum to the minimum scan temperature at a rate of 10° C./min. The "melting endotherm peak temperature" is defined as the peak temperature of the first melting endotherm. The heats of melting ($H_1$ and $H_2$) are calculated from the first and second melting scans, respectively. The "melting heat ratio" (Hm ratio) is defined as $H_1/H_2$. The melting heats $H_1$ and $H_2$ are determined by instrumental integration using a base line from 80° C. below to 30° C. above the peak temperature. The "melt onset temperature" is determined graphically by plotting the derivative of the first melting scan using the Du Pont General Analysis Program, Version 1.0. It is defined as the temperature where the expanded derivative curve first increases above the zero base line (on the low temperature edge of the melting curve) by 0.2 mW/min.

EXAMPLE 1

A tetrafluoroethylene/hexafluoropropylene (TFE/HFP) copolymer, 7.6 mole % HFP, in aqueous dispersion form was obtained by polymerizing TFE and HFP in an aqueous medium according to the general procedure of U.S. Pat. No. 4,380,618 using potassium and ammonium persulfate initiators and ammonium perfluorocaprylate surfactant. The copolymer was coagulated by using 1250 ml dispersion (26.4% solids) diluted with 500 ml of demineralized water in a 3.5-liter stainless-steel beaker (152 mm in diameter) equipped with four equally spaced, rectangular baffles protruding 13 mm into the beaker. The agitator impeller had four 34 mm × 17 mm × 3.2 mm thick blades welded onto a 17 mm diameter hub at 35 to 40° pitch from horizontal to pump upward when rotated clockwise. Impeller diameter was 85 mm. The contents were agitated at 900 rpm and 3.0 ml of 70 weight % nitric acid was then added to produce a thick gel. After 3 minutes, 160 ml of Freon ® 113 was added to break the gel and granulate the polymer. Agitation was stopped 5 minutes later. The aqueous phase was poured off, 1000 ml of demineralized water was added, and the polymer agitated for 5 minutes at 500 rpm. The aqueous phase was again poured off and the polymer was dried in a 150° C. air oven for 4 hours. This overall procedure was repeated three more times to obtain a total of 1500 g of polymer (melt viscosity 6.2 × 10$^4$ poise at 372° C.). This copolymer was screened on a 30-mesh sieve to remove fines and yield a product with a D50 of 1210 micrometers and a sphere factor of 1.33. About 1000 g of this polymer was divided into eight essentially equal samples using a sample splitter. Seven of these samples were baked in an air oven at various conditions to harden the granules. The eighth sample was left unbaked as a control. The attrition factors measured on all eight samples are given below.

| Sample | Baking Conditions | | Attrition Factor |
|---|---|---|---|
| | Time, hrs | Temperature °C. | |
| 1 | 2 | 222 | 35.5 |
| 2 | 2 | 233 | 13.1 |
| 3 | 4 | 233 | 4.7 |
| 4 | 2 | 239 | 6.0 |
| 5 | 4 | 239 | 2.2 |
| 6 | 2 | 245 | 3.9 |
| 7 | 4 | 245 | 1.8 |
| Unbaked control | | | 92.3 |

All the temperatures for Samples 1 through 7 are between 25° C. below the DSC melt onset temperature and the melt endotherm peak temperature.

Two samples of this polymer (125 g each after screening to remove fines), one which had been baked at 239° C. for four hours to harden the granules, and the second which was not baked, were fluorinated in a stainless-steel shaker tube for 4 hours at 160° C. using a 25% fluorine in nitrogen atmosphere at 0.69 MPa gauge pressure. Total processing time was just over 5 hours. These samples were screened on a 30-mesh sieve to determine the amount of fines generated in the shaker-tube treatment with the following results:

| Sample | Attrition Factor | % Fines Generated (through 30 mesh) |
|---|---|---|
| Unbaked | 92.3 | 6.1 |
| Baked at 239° C. | 2.2 | 0.5 |

| | DSC data were as follows: | |
|---|---|---|
| | Before Baking | After Baking |
| Peak Temperature | 262° C. | 263° C. |
| Melting Heat Ratio | 1.45 | 1.56 |
| Melt Onset Temperature | 248° C. | 244° C. |

The dried polymer had 440 unstable end groups per 10$^6$ carbon atoms. The polymer was fluorinated at 160° C. for 4 hours at 100 psig in a shaker tube using a 25% fluorine and 75% nitrogen gas mixture. Unstable end groups were reduced to less than 80 per 10$^6$ carbon atoms.

EXAMPLE 2

A TFE/HFP copolymer (5.9 mole % HFP) was polymerized at 3.1 MPa gauge pressure and 95° C. with ammonium perfluorocaprylate dispersing agent and ammonium persulfate initiator. The resulting dispersion (19.0% polymer) was coagulated similarly to that of Example 1. Per 100 parts of copolymer on a dry basis, 6 parts of 60 weight % nitric acid and 93 parts of Freon(tm) 113 were used. The polymer was washed several times with demineralized water to remove the nitric acid. The Freon(tm) was boiled off by a warm water (60° C.) wash under slightly reduced pressure. The polymer was separated from the aqueous phase and heat hardened in a 220° C. circulating air oven for 8 hours. Analysis showed the presence of 448 unstable end groups per 10$^6$ carbon atoms consisting of —COF, —CO$_2$H(M), and —CO$_2$H(D).

A 22.7-kg portion of the hardened granules was treated with fluorine at 190° C. for three hours while being tumbled in a vessel described as follows. The fluorination reactor was a 0.1 m$^3$ double-cone blender provided with gas inlet and vent connections and an electric heating mantle. The gas inlet dipped down into the particles and the vent pointed up into the vapor space. Both lines were fixed and remained stationary when the blender was rotated. The polymer granules were placed in the reactor which was then sealed and rotated at 5 rpm. The polymer was heated by both the electric mantle and a preheated air stream flowing through the reactor. When the polymer reached the desired temperature, the air flow was cut off and a vacuum was applied. The pressure was raised to atmospheric with a mixture of fluorine/nitrogen (25%/75% by volume) and this mixture was fed through the reactor continuously for three hours while maintaining the temperature with the electric mantle heater. The gas feed was then switched to 100% nitrogen until no fluorine was detected in the off-gas using moistened starch-iodide paper. The resin was then cooled with cold air passed through the reactor. The reactor was then opened and the resin was collected. The granules had the following properties:

| Melt Viscosity | $12.6 \times 10^4$ poise at 372° C. |
| --- | --- |
| Average Particle Size (D50) | 1480 micrometers |
| Attrition Factor | 54.4 |
| Sphere Factor | 1.16 |
| Unstable Endgroups per $10^6$ Carbon Atoms | 21 |
| DSC Melting Heat Ratio | 1.60 |

The fluorinated granules were fed to a 32-mm diameter Waldron-Hartig extruder with a 20:1 L/D barrel and coated onto AWG #20 19/32 stranded copper conductor with an insulation thickness of 0.25 mm. No electrical flaws were detected in the coating at either of two extruder temperature profiles. The coated wire had a dielectric strength of 69 kV/mm (ASTM D-149).

We claim:

1. Melt-processible, substantially nonelastomeric tetrafluoroethylene copolymer comprising recurring units of 80–98 mole % tetrafluoroethylene and complementally 2 to 20 mole % of at least one perfluoroolefin of 3–8 carbon atoms, which copolymer has
    (a) a melt viscosity between $0.1 \times 10^4$ and $100 \times 10^4$ poise at 327° C.,
    (b) a sphere factor less than 1.5,
    (c) an attrition factor of less than 60,
    (d) fewere than a total of 80 unstable end groups per $10^6$ carbon atoms, said end groups comprising —COOH, —COF, —CF=CF$_2$, —CONH$_2$, —CH$_2$OH, or —COOR, where R is an alkyl group of 1–6 carbon atoms,
    (e) an average particle size between 200 and 3000 micrometers.
2. The copolymer of claim 1 which has a melting heat ration greater than 1.20.
3. A copolymer as in any one of claims 1 or 2 wherein the melt viscosity is between $0.5 \times 10^4$ and $20 \times 10^4$ poise at 372° C., and the weight average particle size is between 200 and 500 micrometers.
4. A copolymer as in any one of claims 1 or 2 wherein the melt viscosity is between $1 \times 10^4$ and $100 \times 10^4$ poise at 372° C., and the weight average particle size is between 700 and 3000 micrometers.
5. The copolymer of claim 1 wherein the copolymerizable comonomer is hexafluoropropylene.
6. The copolymer of claim 1 which contains minor amounts of at least one additional comonomer.

* * * * *

UNITED STATES PATENT AND TRADEMARK OFFICE
CERTIFICATE OF CORRECTION

PATENT NO. : 4,742,122

DATED : May 3, 1988

INVENTOR(S) : Marlin Dwight Buckmaster and Richard Alan Morgan

It is certified that error appears in the above-identified patent and that said Letters Patent is hereby corrected as shown below:

Claim 1, column 12, line 7, "327°C" should be -- 372°C --.

Claim 1, column 12, line 10, "fewere" should be -- fewer --.

Signed and Sealed this

Twenty-fifth Day of October, 1988

Attest:

DONALD J. QUIGG

Attesting Officer

Commissioner of Patents and Trademarks